Dec. 3, 1935.  S. A. B. HAMILTON, JR  2,023,018
SPEED CONTROL MECHANISM
Filed Sept. 29, 1933   5 Sheets-Sheet 1
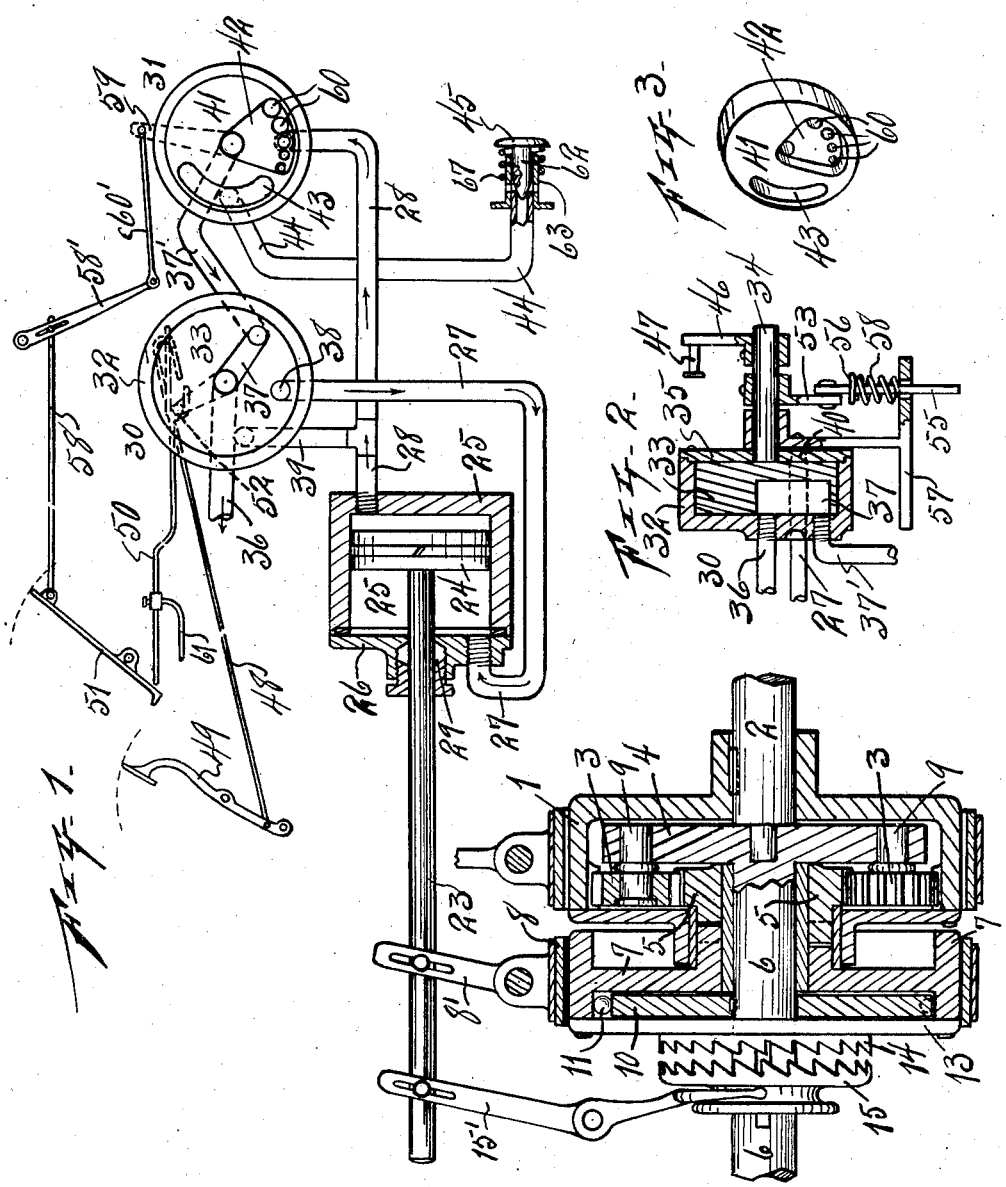
INVENTOR.
S. A. B. HAMILTON JR.
BY
ATTORNEY.

Dec. 3, 1935.  S. A. B. HAMILTON, JR  2,023,018
SPEED CONTROL MECHANISM
Filed Sept. 29, 1933  5 Sheets-Sheet 2
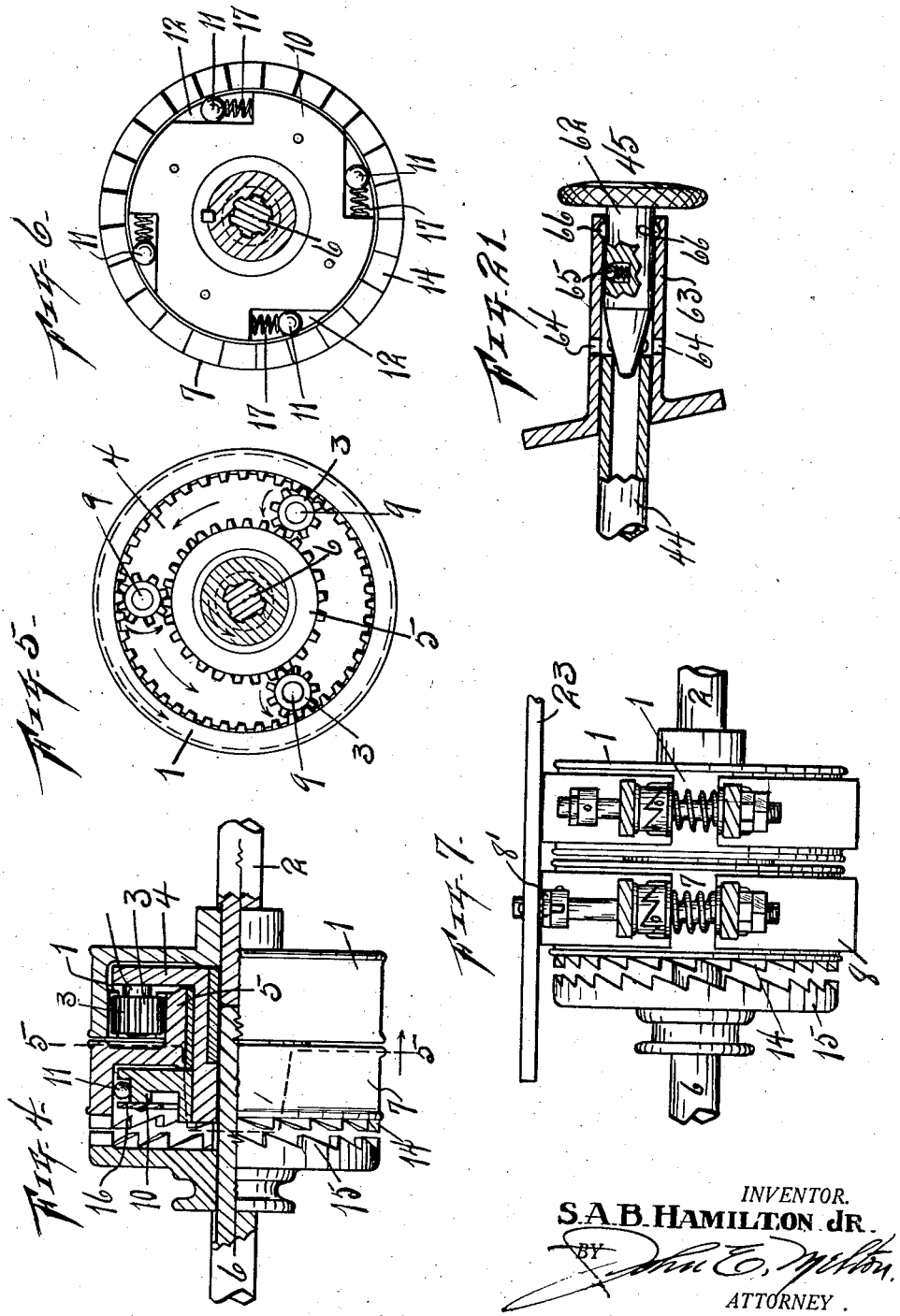
INVENTOR.
S. A. B. HAMILTON JR.
BY
ATTORNEY.

Dec. 3, 1935.  S. A. B. HAMILTON, JR  2,023,018
SPEED CONTROL MECHANISM
Filed Sept. 29, 1933  5 Sheets-Sheet 3
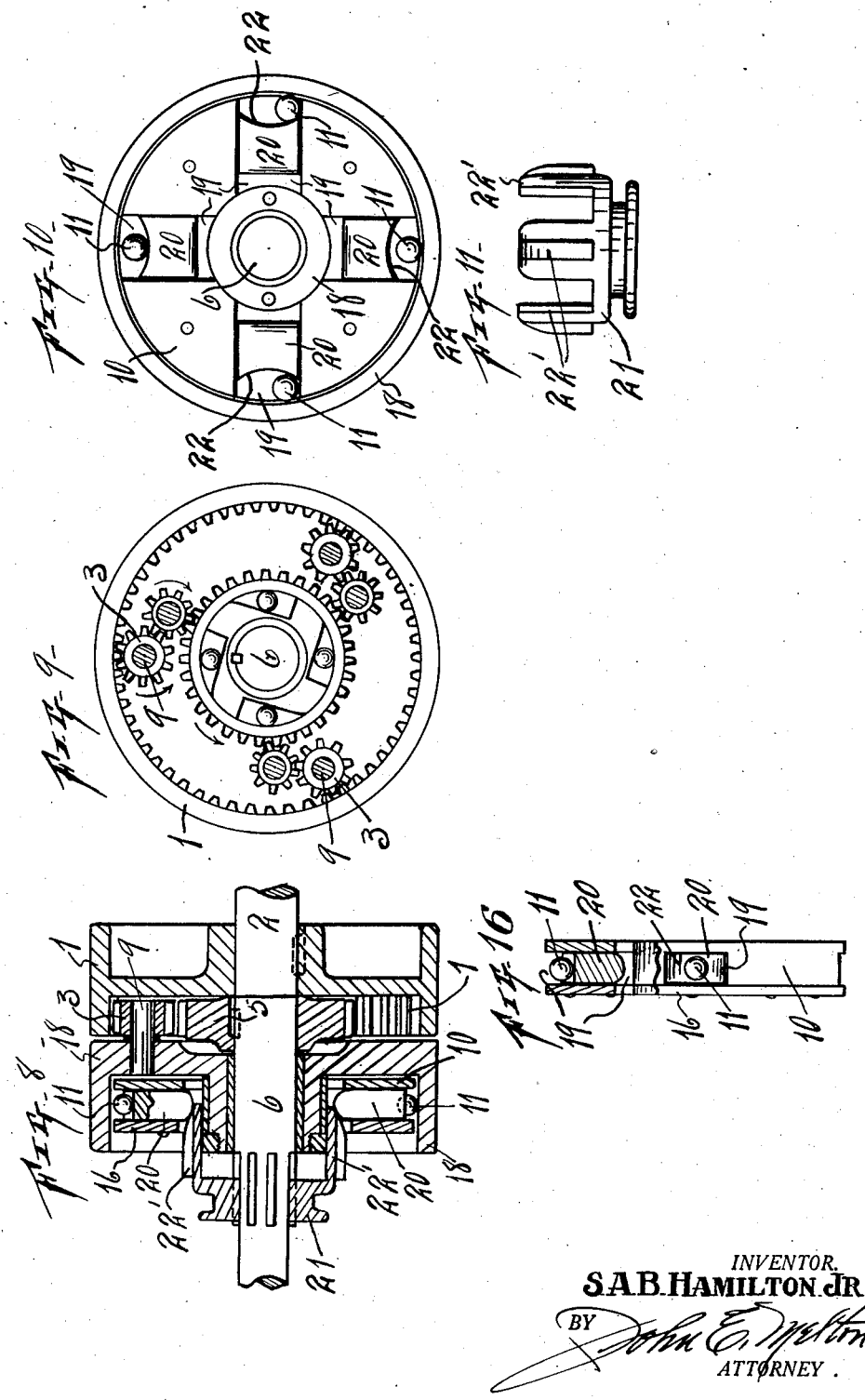
INVENTOR.
S.A.B.HAMILTON JR.
BY
ATTORNEY.

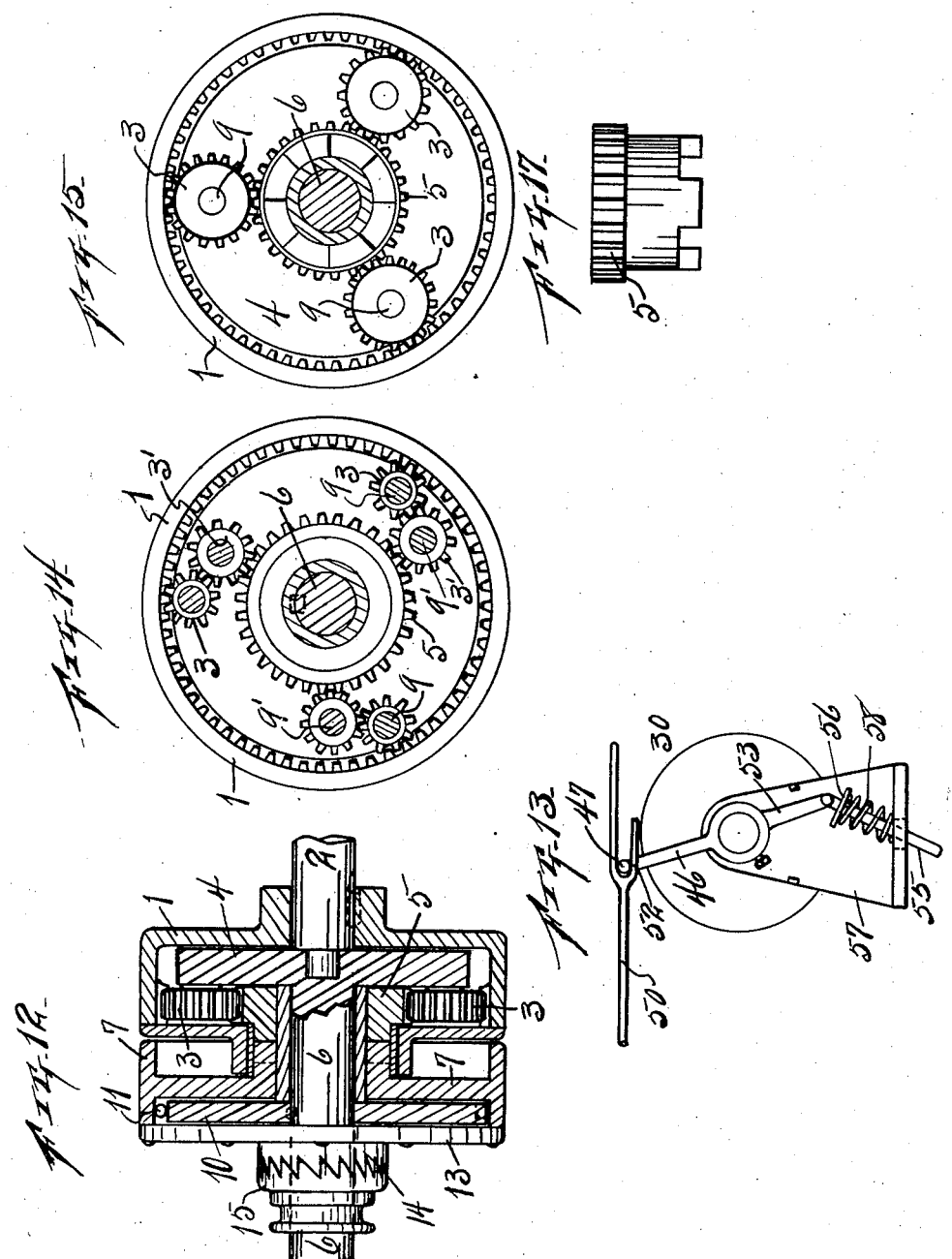

Dec. 3, 1935.  S. A. B. HAMILTON, JR  2,023,018
SPEED CONTROL MECHANISM
Filed Sept. 29, 1933  5 Sheets-Sheet 5
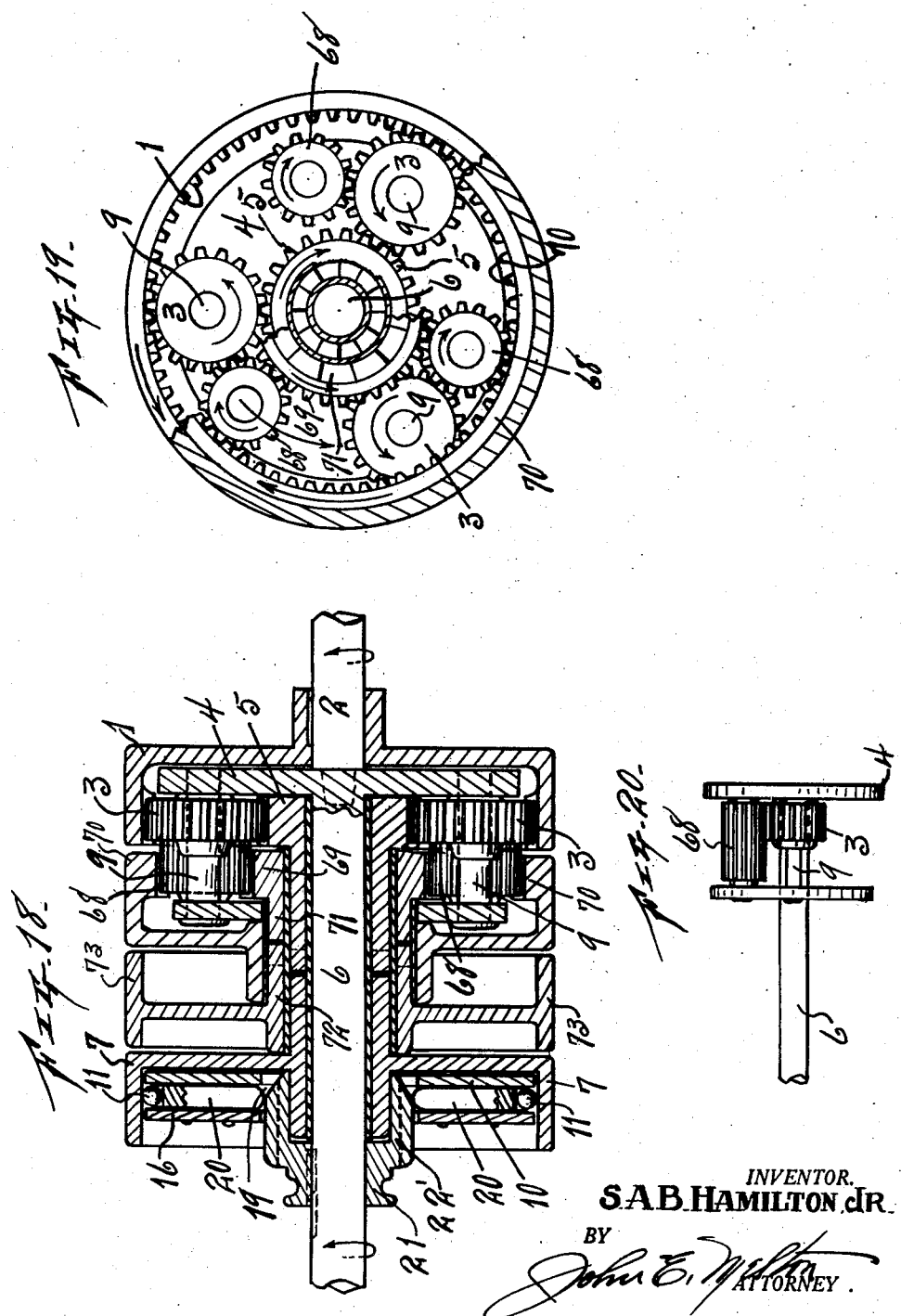
INVENTOR.
S.A.B.HAMILTON, JR.

Patented Dec. 3, 1935

2,023,018

UNITED STATES PATENT OFFICE 2,023,018

SPEED CONTROL MECHANISM

Samuel A. B. Hamilton, Jr., Fort Worth, Tex.

Application September 29, 1933, Serial No. 691,449

19 Claims. (Cl. 74—290)

My invention relates to speed control mechanism for motor vehicles and the like, and more particularly to a transmission or what is known in the trade as an "under drive" mechanism; and the object is to provide a device which will either serve as a transmission for a vehicle or coact with the vehicle transmission for driving the vehicle in a plurality of ratios. Another object is to provide a speed control mechanism in which all gears of the same are constantly in mesh and the shift from one speed to the other may be manually controlled or the shifting may be controlled by the vehicle clutch and accelerator levers. Still another object of this invention is to provide a device for controlling the motor-vehicle ratio without the use of the conventional vehicle clutch or shift lever. Still another advantage of this device is that it is compact in structure and may be adapted to be used with a two speed axle or an axle with a smaller ring gear which will permit greater road clearance for the vehicle.

An advantage of this mechanism is that the equivalent of a two speed axle may be used without the increase of unsprung weight usually found in the prevailing structures. Another advantage is that the mechanism is light in structure and inexpensive to manufacture and may be easily controlled manually or automatically for driving a vehicle throughout a plurality of gear speeds. Another advantage is that the mechanism is so constructed that all of the gears are locked together and the device rotates as a whole when the vehicle is driven directly or in high, thus eliminating all noises and wear of the parts. Other objects and advantages will be fully explained in the following description and the invention will be more particularly pointed out in the claims.

Reference is had to the accompanying drawings which form a part of this application.

Fig. 1 is a vertical section of the device, showing a diagrammatic view of a means of controlling the same.

Fig. 2 is a vertical section of one of the valves of the vacuumatic unit of the control system.

Fig. 3 is a perspective view of the core of one of the vacuum line valves of the control unit.

Fig. 4 is a vertical section of a portion of the device, showing a variation in the assembly of the gears of the same.

Fig. 5 is a face view of the gearing, taken on the line 5—5 of Fig. 4, showing the direction of travel of the gears during forward drive of a vehicle.

Fig. 6 is a face view of the free-wheeling disk or synchronizing member, shown with the disk plate removed.

Fig. 7 is a plan view of the device, illustrating the arrangement of the brake mechanism for the same.

Fig. 8 is a view of the device, showing the arrangement of the gears for attaining an over drive.

Fig. 9 is a face view of the gearing of the same, provided with free-wheeling connection between the sun gear and axis of the device.

Fig. 10 is a face view of a clutch mechanism used in the device and adapted to act without the necessity of synchronizing structure.

Fig. 11 is a plan view of the clutch of the same.

Fig. 12 is a figure similar to the view of the mechanism shown in Fig. 1 with the device shifted for a direct drive.

Fig. 13 is a detail view of the snap action of the vacuum valve.

Fig. 14 is a view similar to the view shown in Fig. 9, showing the over drive mechanism with the sun gear made rigid with the load shaft.

Fig. 15 is a face view of the gearing shown in Fig. 12.

Fig. 16 is an edge view of Fig. 10, showing a portion in section to illustrate the lug and its ball mechanism.

Fig. 17 is a plan view of the sun gear and its flange form for connecting with its drum shaped wheel.

Fig. 18 is a vertical section of the device arranged to serve as the full transmission for a vehicle without the necessity of the conventional clutch of the vehicle.

Fig. 19 is a face view of the gearing of the same.

Fig. 20 is a plan view of the load shaft and a pair of planet gears carried thereby.

Fig. 21 is a detail view of the free-wheeling vacuum relief valve for the control unit.

Similar characters of reference are used to indicate the same parts throughout the several views.

The device consists of a plurality of gears formed into an operating unit which are adapted to either coact with the transmission of a vehicle to drive a motor vehicle in one or more ratios, or to serve as the transmission of the vehicle. The illustrations show the device with the various gears arranged in many positions relative to each other so that the principle may be used to decrease or increase the speed of the load shaft relative to the speed of the drive shaft.

The device consists of a drive gear 1 which is keyed to or made rigid with the transmission main shaft and adapted to be driven thereby. The gear 1 is meshed with and adapted to drive an idler gear 3 which is rotatably journaled on a disk 4. The disk 4 is rigidly carried on a load shaft 6. There may be one or more idler or planet gears 3 journaled on the disk 4 in position to mesh with the drive gear or orbit gear 1, as shown in Fig. 5, or the planet gears may be arranged in pairs on the disk 4, as shown in Fig. 9. When they are arranged in pairs the outer planet gears 3 mesh with the orbit gear 1 and the gears 3' or the inner gears of the disk 4 are adapted to mesh with the gears 3 and the sun gear 5 of the device.

In Fig. 5 the train of planet gears 3 mesh with and drive an inner gear or sun gear 5 which is loosely journaled within the device so that it may be held against rotation and serve as a track for the planet gears 3 or be clutched with the load shaft 6 of the device and be caused to rotate with the gears 3 and 1. When the gear 5 is held against rotation it will serve as a track for the planet gears 3 to travel around which in turn drives the load shaft 6 by means of the planet gear disk 4. When the sun gear is released and then clutched with the load shaft 6 it is locked with the planet gears 3 so that all gears 1, 3, and 4 will rotate as a unit and drive the shaft 6 directly. The means of holding the sun gear or inner gear against rotation consists of an extension which is made rigid with the gear 5 and formed to provide a drum wheel 7 which is provided with a brake band 8. The brake band 8 may be journaled in the casing of the device (not shown) and actuated by means of a lever 8' which is pivotally connected to an actuating shaft.

In Fig. 1 the driven gear 1 is keyed to the shaft 2 of the transmission of the vehicle and the train of gears 3 are rotatably mounted on the disk 4 by means of pins 9. The disk 4 is made integral with the propeller or load shaft 6 and the inner gear 5 is rotatably journaled on the shaft 6. A freewheeling disk 10 is keyed to the shaft 6 and positioned thereon so as to rotate within the inner periphery of the tire of the band wheel 7 of the gear 5.

The disk 10 is provided with engaging balls or rollers 11 which are positioned in cavities 12 of the outer periphery of the disk 10 and adapted to either engage the band wheel 7 and lock the same with the shaft 6 or permit the wheel 7 to rotate independent of the disk 10 and its shaft 6, as shown in Fig. 6. The disk 10 and its rollers 11 are adapted to only lock the wheel 7 with the shaft 6 in one direction. The object of the freewheeling disk 10 is to provide synchronism of the band wheel 7 with the shaft 6 so that the drum wheel 7 may be clutched to the shaft 6 by means of the clutches 14 and 15, as shown in Fig. 12.

A plate 13 is made rigid with the side of the drum wheel 7 so as to encase the disk 10 and its rollers 11 and this disk is provided with a face clutch 14, made rigid therewith and adapted to engage a similar face clutch 15. The clutch 15 is slidably keyed to the load shaft 6 of the device and when it is moved to engage the clutch 14 the gearing of the device will be locked together and the whole will rotate as a unit, tying the two shafts 2 and 6 together, so that the motor of a vehicle will drive the vehicle directly.

In Fig. 4 the disk 10 is provided with its own plate 16 which is made fast to the face thereof and adapted to retain the balls 11 in their respective cavities 12. In this instance, the clutch face 14 is made as an integral part of the drum portion 7 of the gear 5.

The structure of the disk 10 consists of a plate device which is made rigid with the shaft 6, as shown in Figs. 1 and 12, or rigid with the sleeve of the gear disk 4, as shown in Figs. 4 and 6; or of the special construction and application as shown in Figs. 8 and 10. The outer periphery of the disk 10 is provided with a cavity 12 which is made deep into the disk at one end and sloping to the circumference of the disk at the other end of the cavity, making a semi-triangular groove form. The object of the shape of the cavity 12 is to provide such a shape that will permit the ball 11 of each cavity to be moved by the rotation of the disk 10 and its cooperating rotating member as to permit the two to rotate independently in one direction and to bind the ball in its cavity when rotated in the opposite direction, to cause the disk 10 and the wheel 7 to be locked together. In Fig. 6 the balls 11 are each provided with a spring tension so that they will normally be forced towards the binding portion of the cavity 12 and lock the disk 10 with the portion 7 so that when the member 7 is rotated anti-clockwise it will cooperate with the balls 11 to force the disk 10 and its cooperating parts to rotate with the member 7. The spring tension on each of the balls 11 consists of a coil spring 17 which is interposed between the ball 11 and the side of the greater depth of the cavity 12.

This arrangement of locking the disk 10 and the drum wheel 7 together acts to synchronize the two so that the clutches 14 and 15 will readily engage. It will be noted that when either of the gears which are used to decrease the speed of the shafts 2 and 6 relative to each other, that is, the gears that serve as a track for the train of gears 3, have tendency to rotate in the reverse of the direction of the rotation of the shaft 6, which must be overcome by the brake 8. When the brake is released the track gears will start to rotate in reverse of the load shaft 6 until the disk 10 and its cooperating parts take effect and stop such rotation by means of the ball or roller lock.

The structure of the speed control units may be varied in general arrangement or in the relation of the gears to each other and still give the required speed ratio so that the drive of the transmission shaft may drive the vehicle in one or more low ratios or directly. Figs. 14 and 15 show a comparative arrangement of the use of one or a pair of planet gears carried on the same disk 10 and clutch 14—15 structure, as shown in Figs. 1 and 12. In Figs. 1, 4, and 12, the structure is arranged so that when the sun gear 5 is held stationary by the brake 8 it will serve as a track for the planet gears of the disk 4 and cause the planet gears to travel around the sun gear 5 for driving the vehicle in a low ratio. When the brake 8 is released and the clutches 14 and 15 are engaged the motor vehicle ratio will be governed by the gearing in the differential.

This principle of structure may be used for an increased ratio, as shown in Fig. 8, wherein the disk 4 of the planet gears 3 is held stationary so that they will rotate the sun gear and drive the vehicle through the sun gear when they are actuated by the orbit gear 1 of the device. In this structure the planet gear drum 4 consists of drum shaped wheel 18 which is also adapted to be held by the brake band 8 and controlled similar to the control shown in Figs. 1, 4, and 12. In this instance the disk of the train of gears is formed in a drum wheel 18. The wheel 18 is rotatably mounted on the shaft 6 and provided with a clutch disk 10 which is adapted to fit within the inner periphery of the tire of the drum or disk wheel 18. The disk 10 is provided with a plurality of inset cavities 19 in the face thereof which radiate from its center. Each of the cavities 19 are provided with a lug 20 which is adapted to be reciprocated therein by means of a sliding yoke 21. The outer extremity or the ends of the lugs 20 are each provided with an arc shape formed concave to serve as a track 22. The arc track 22 of the lugs 20 are concaved from the inner periphery of the tire of the drum wheel 18 so that when the lugs 20 are moved out from the axis of the disk 10 they will cause the balls or rollers 11 of the disk 10 to be wedged against the drum wheel 18 of the device and lock the same with the disk 10 and its cooperating parts.

The yoke 21 is slidably keyed to the shaft 6 of the device and adapted to be actuated so that the balls or rollers 11 will act to clutch the drum wheel 18 and the disk 10 together or free the two so that they may be rotated independent of each other. The sliding yoke 21 is provided with a plurality of projections 22 which extend axially therefrom and are adapted to extend into each of the cavities 19 between the lugs 20 and the hub of the disk 10. The extensions or projections 22' of the yoke 21 are wedge shaped or beveled on their outer ends so as to cause the lugs to be forced outwardly from the axis of the disk 10 as the extensions are moved into the cavities 19. Each of the extensions 22 are so shaped and arranged relative to the inner ends of the lugs 20 as to always remain partly within each of the cavities so that they may serve as a key to hold the disk 10 rotatably rigid with the yoke 21 and its shaft 6. This structure permits the action of the yoke to either clutch the member 7 with the disk 10 or free the two so that they may be actuated independent of each other.

It is apparent that various means may be used for controlling the speed control mechanism either manually, with attachments extended to within suitable distance from the operator of the vehicle, or by means of connections with the conventional control levers and clutches of a vehicle; or the mechanism may be controlled automatically by vacuum or other suitable power from the engine of the vehicle so that the various gear changes of the device will be in keeping with the motor-vehicle ratio.

A preferable and simple control of the mechanism is diagrammatically illustrated in Fig. 1 in which the clutch and brake of the device is actuated together by means of a vacuum or other suitable source from the motor of the vehicle. In this instance a bar 23 is slidably mounted adjacent the device and pivotally connected to the brake and clutch of the mechanism so that its reciprocation will actuate the brake and clutches in accordance with the direction and control of the power flow through the vacuum unit. One end of the bar 23 is provided with a piston 24 rigid therewith and adapted to travel within a cylinder 25. The open end of the cylinder 25 is provided with a cap 26 so that power may be applied to both ends of the piston 24 for moving the same to various positions within the cylinder 25. The cylinder 25 is connected to the vacuum manifold of the motor or other suitable source of supply (not shown) by means of pipes 27 and 28. The rear end or the open end of the cylinder 25 is provided with a packing gland 29 so as to seal the power within the rod end of the cylinder. A pair of power flow valves are interposed within the vacuum lines between the source of supply and the cylinder 25 for manually and automatically controlling the power flow to the cylinder and its piston 24. One of the valves or the valve 30 is adapted to be actuated by the clutch, accelerator, and reverse yoke shaft of the transmission of the vehicle; and the other valve or valve 31 is adapted to be actuated by the accelerator of the vehicle.

The valve 30 consists of a housing 32 which is adapted to contain a core 33 having an axle shaft 34 made rigid therewith, as shown in Fig. 2. The core 33 is encased in the housing 32 by means of a cap 35 so that the core may be oscillated in its housing for directing the flow of power to the cylinder 25 through the various channels. The vacuum from the supply is directed through the center of the housing 32 of the valve by means of a pipe 36 which registers with a slot 37 in the core 33. The slot 37 is positioned radially in the face of the core, adjacent the base of the housing and adapted to extend from the center of the core to near the outer periphery of the core 33 so as to direct the vacuum from the pipe 36 to one of two exits which register with the housing 32, near the outer periphery thereof. One of the two exits from the housing 32 is the pipe 27 which provides a flow connection between the rear end of the cylinder 25 and the valve 30, and the other exit is a pipe 37' which registers with the housing 32 of the valve 30 and to the center of the valve 31. The valve 30 is provided with an opening 38 drilled axially therethrough and near the outer periphery thereof, adjacent the outer end of the slot 37, so that when the slot 37 is positioned to register with the pipe 37' and with the supply pipe 36 the opening 38 will register with the pipe 27 to permit a release of the rear of the cylinder 25, when the piston 24 is being drawn forward, as shown in Fig. 1. A third pipe connection is made to the valve 30, near the outer periphery thereof, which consists of a pipe 39 which connects with the pipe 28 and provides a passage from the front of the cylinder 25 to the valve 30. Each of the three connections 39, 27, and 37' are equidistant apart around and near the outer periphery of the valve 30 so that the valve 30 may be actuated to two positions to either register with or blank the same. The position of the valve 30, shown in Fig. 1, admits the power flow to the front of the cylinder 25 via the pipe 37' to the valve 31 and to the cylinder through the pipe 28; and the relief of the rear of the cylinder is admitted through the pipe 27 and opening 38 of the valve 30, the connection 39 being blanked by the core of the valve 30 so as to not interfere with the flow of power through the pipe 28. The cap 35 of the valve housing 32 is provided with an opening 40 which is positioned opposite the connection 27 so that the valve opening 38 will register with the two, when the valve core is positioned as shown in Fig. 1. When the valves 30 and 31 are positioned, as shown, the flow of power will pull the piston forward which will actuate the brake 8 of the mechanism so that the drive of the vehicle will be in the low ratio.

The valve 31 is of similar structure to the valve 30 in its housing and core arrangement. The core 41 of the valve 31 is provided with a slot 42 which radiates from the center thereof, in a fan shape, to near the outer periphery of the core. An arc shaped slot 43 is also provided in the face of the core 41 near the outer periphery thereof, the end of which is positioned adjacent the edge of the fan shaped slot 42, as shown in Figs. 1 and 3. Each of these slots extend only partly within the face of the core of the valve 31 and are so positioned relative to each other as to intermittently permit power flow from the tube 37' through the valve 31 and tube 28 to the front of the cylinder 25, or admit relief to that end of the cylinder via the tube 28, through the slot 43 of the valve 31, and out through a tube connection 44 which registers with the valve 31. The tube 44 is connected with the valve 31 similar to the tube connection of the tube 26 and extended to a position, convenient to the operator of the vehicle, where the end of which is provided with a manually controlled valve 45. The object of the relief tube 44 is to provide a control means for the passage of the tube 44 for permitting a free-wheeling or neutral position for the vehicle at certain stages of the forward drive of the vehicle.

The shape of the slot 42 of the core of the valve 31 permits a graded opening to register with the valve power intake 37' and the pipe 28 to the vacuum cylinder 25. The object being to admit only a small amount of vacuum to the cylinder upon starting the vehicle so that there will be a slippage in the brake 8, thus eliminating the necessity of using the vehicle clutch for starting the vehicle and permitting the speed control mechanism to be utilized in starting the vehicle in the high transmission gear without the usual jerk of the vehicle. When the speed control is used as the complete transmission the brakes of each unit of the device may be used in the place of the vehicle clutch.

The valve 30 may be oscillated from one position to the other by means of the various control levers used in the conventional drive of a vehicle. The axle 34 of the valve core 33 is provided with an arm 46 made integral therewith and extended at right angles thereto. The arm 46 is provided with a pin 47 on its outer end that may be engaged and actuated by a plurality of connecting bars, one to each of the accelerators, vehicle clutch, and reverse gear yoke shaft of the vehicle. A bar 48 is attached to the vehicle clutch 49 and extended over the pin 47 of the valve 30 to a position or distance equivalent to the maximum travel of the arm 46 in a direction from the clutch, where the same is bent to form a loop which will engage and pull the arm 46 back towards the clutch, when the clutch is depressed to its maximum depth or position. The bar 48 is adapted to ride upon the pin 47 of the arm 46 during the oscillation or swing of the arm 46, so that the loop of the bar will at all times be in a position relative the pin 47 to return the valve towards the rear of the vehicle.

A second bar 50 is slidably mounted adjacent the arm of the valve 30 so that one end will be in the path of the lower portion of the accelerator 51 of the vehicle, when the valve 30 is positioned for low ratio, and the other end of the bar is extended so as to ride upon the pin 47 of the valve 30. A loop or projection 52 is provided on the end of the bar 50, near the end thereof, which projects downwardly and against the pin 47 when the valve 46 is in its extreme rear position. When the accelerator 51 is depressed by the heel of the operator it will be caused to be moved in the opposite direction to the movement for acceleration and the lower end of the accelerator will engage and move the bar 50 so that its projection or loop 52 will engage the pin 47 and move the core of the valve 30 forward or to a position for driving in the high ratio. Each of the bars 48 and 50 are positioned relative to their respective actuating members so as to be moved by the same only when the members are moved in such a manner as would not interfere with their normal function. This arrangement of throwing the valve 30 to either low or high ratios permit the operator of the vehicle to make such a change in accordance with the action of the motor and vehicle movements. It has been found from actual operation of the device that when the motor is decelerated the mechanism can be more easily changed from the low to the high ratio, and that the time required in releasing the accelerator 51 of the vehicle and depressing the base of it, to transfer the mechanism, permits the device to actuate to synchronize the clutch faces and permit a movement which will function to change the motor-vehicle ratio in a very desirable manner. This form of control of the change of ratio in the mechanism, from low to high, eliminates any danger of the operator to make a change that is not in keeping with relative speed of the motor and the vehicle, as the smooth change from low to high should be made as the motor is being allowed to decelerate.

This is also true of the transfer of the ratio of the mechanism from high to low. When a motor is being taxed during the drive in a high gear by a heavy load or steep incline the tendency of the operator is to depress the clutch of the vehicle and change to a lower transmission gear. In this structure the operator may depress the clutch to its lower extremity which will shift the valve 30, by means of the bar 48, so that the mechanism is moved to the low ratio.

The movement of the valve 30 is preferably provided with a snap action mechanism which will automatically switch the same from one position to the other. The object of this mechanism is to insure perfect positioning of the valve to its two positions and to eliminate the necessity of having to move the actuating bars to any great extent for changing the valve to its positions. The snap action mechanism of the valve consists of an arm 53 which is made integral with the shaft of the core of the valve and radiates therefrom. The outer end of the arm 53 is pivotally connected to a shaft 55 which projects through a slot in the base of the bracket 57 of the valve 30. An adjustable collar 56 is provided on the shaft 55 and positioned adjacent the pivotal connection of the shaft 55 with the arm 53. A coil spring 58 is interposed between the collar 56 and the bracket 57 of the valve so that the tension of the same will cause the core 33 of the valve 30 to be moved to one position or the other. When the operating levers engage the arm 46 of the valve and move the same midway of its travel from one to the other of the two positions, the spring 58 will cause the valve core to continue such movement until the same has reached its maximum movement.

The operation of the valve 31 is to either position the valve for directing the flow of power to the cylinder 25, for moving the piston rearwardly or to a position where the power flow is passed through the valve 31 and to the cylinder 25 for moving the piston 24 forwardly. A bar 58 is connected to the upper end of the accelerator 51 and to the arm 59 of the valve 31, or the bar 58 may be connected to the arm 59 through a lever connection which consists of a lever 58' which is pivotally connected to a rigid member (not shown) of the vehicle adjacent the valve 31. The bar 58 is pivotally connected to the lever 58' near the pivotal end of the same and a link bar is pivotally connected to the free end of the lever 58' and to the arm 59 of the valve 31. This arrangement permits the accelerator 51 of the vehicle to be depressed to its fullest extent without imparting a greater movement to the valve core 41 of the valve 31 than is necessary to cause the valve to function in the desired manner.

The valve structure of the valve 31 is similar to the structure of the valve 30 except the structure of the core 41 of the same. The core 41 of the valve 31 is provided with a fan shaped slot in the face thereof, adjacent the base of the housing of the valve. The slot 42 is positioned so that it registers with pipe connection 37', in the center of the housing, and radiates outwardly to near the outer periphery of the core 42 where it is enlarged so as to be provided with a series of openings 60. The openings 60 are placed annularly within the slot 42, near the outer periphery thereof, and adapted to register with the pipe connection 28 for conveying the power flow to the cylinder 25 for moving the piston 24 forward. The openings 60 are graded in sizes, the smaller opening being placed so as to register with the pipe 28 first and then the next larger will register with the pipe, when the accelerator is depressed, and so on until the larger openings 60 are brought into registration with the pipe 28. The openings 60 being arranged so that each may be continuously brought into registration with the pipe connection 28 so that the flow will be permitted to pass from the slot 42 to the pipe 28.

Another slot 43 is provided in the face of the core 41 and this slot is arc shaped and positioned in the face of the core 41 opposite the position or on the opposite face of the core from the fan shaped slot 42. The slot 43 is positioned so that the core may be moved to bring the same into registration with the pipe connection 28 and the pipe 44 so that the relief of the forward end of the cylinder 25 may be effected through the pipe 28, the slot 43, pipe 44, and through the hand operated free-wheeling valve 45. The relative positions of the slots 42 and 43 permit the valve 31 to either convey the power flow to the front of the cylinder 25 for a drive of the mechanism in a low ratio, or to relieve the front of the cylinder when the valve 45 is opened.

The piston rod 23 of the cylinder is pivotally connected with the clutch arm and the brake arm 15' and 8' respectively of the mechanism so that the reciprocation of the rod 23 will either place the mechanism in a neutral position, or in a low or direct drive position. If the mechanism is standing in a neutral position, that is, the brake 8 is off and the clutches 14 and 15 are disengaged, the transmission lever may be positioned in either of the forward conventional speed positions and the vehicle started without the use of the conventional vehicle clutch 49. This is done by pressing the clutch 49 of the vehicle to its extreme position so that the valves will be positioned so that the power flow is directed to the vacuum unit through the valve 30, valve 31, and pipe 28 to the front of the cylinder. The power flow is then permitted to gradually pass to the cylinder 25 by means of accelerating the accelerator gradually so that the smaller openings 60 of the valve 31 will first register with the pipe connection 28. This permits the vehicle to be started from a standstill in either of the forward transmission speeds and the low mechanism ratio without jerking the vehicle. If the operator then wishes to change the transmission speed of the vehicle he may do so in the usual manner without affecting the position of any of the speed control mechanism. If he wishes to change the mechanism to the forward direct drive or high ratio he may do so by depressing the vehicle accelerator 51 with his heel, to its extreme position, which will change the power flow to pass through the valve 30 and direct to the rear of the cylinder 25 which acts to cause the clutches 14 and 15 to engage.

If the operator of the vehicle wishes to drive the vehicle in reverse he will do so in the usual manner by placing the transmission lever in reverse which will automatically position the mechanism of the speed control in direct drive. This is done by a link bar 61 which connects the reverse yoke shaft of the transmission with the shaft 50 of the speed control device.

The object of the valve 45 is to permit the vehicle to free-wheel when being driven in the low ratio of the mechanism. When the valve 45 is open the power on the front of the cylinder will be relieved through the pipe 28, valve 31, and pipe 44, each time the accelerator 51 is permitted to move to normal position. When the valve 45 is closed, the movement of the valve 31 to normal position or when the accelerator is permitted to travel to normal position, will not affect the vacuum unit because the relief of the front of the cylinder will not be permitted.

The valve 45 may be of any structure suitable for this purpose and positioned at a convenient place so that the operator of the vehicle may open or close the same at will. The valve 45 may consist of a slide plunger 62 which is beveled at one end so that the bevel seats within the end of the pipe 44 for closing the same, as shown in Fig. 21. A flanged collar 63 is made rigid with the end of the pipe 44 and adapted to serve as a bearing for sliding the plunger 62. The flange of the collar may be utilized for anchoring the valve to the instrument panel of the vehicle or some other suitable part of the vehicle within easy reach of the operator. Perforations 64 are provided in the collar 63, adjacent the end of the pipe 44 for the passage of air when the valve is opened. The plunger 62 is provided with a countersunk spring backed ball 65 which is adapted to resiliently press against the inner periphery of the collar. An internal annular groove 66 is provided within the outer end of the collar 63 so that when the valve 45 is opened or when the plunger is pulled from its seat the valve will be held open by pulling the plunger 62 to a position so that the ball 65 will pass into the annular groove 66 of the collar 63. A coil spring 67 may be carried over the collar 63 to act to normally hold the valve in a closed position, as shown in Fig. 1. The spring is positioned on the collar 63 so that one end of the same is anchored to the collar and the other end is stretched and anchored to some exposed portion of the valve plunger 62 when the valve is in a closed position. When the valve is opened the plunger 62 will be held in an open position against the spring tension of the spring 67 by means of the ball 65 and its groove 66.

The structure of the speed control mechanism shown in Figs. 18, 19, and 20 may be used as a complete transmission for a vehicle. This structure will also eliminate the use or necessity of the conventional clutch of the vehicle. The automatic control for actuating this mechanism may be used or the same may be controlled by the operator by means of any suitable connections. In this instance, the planet gears 3 are each provided with an idler gear which is also journaled on the disk 4 of the device. The idler gear 68 is meshed with and driven by the planet gear 3 but does not mesh with either the driven gear or orbit gear 1 or the sun gear 5 of the device. Each of the idler planet gears 68 are adapted to mesh with a pair of gears which are rotatably mounted in the device. The idler gears 68 are elongated axially approximately twice the length of the gears 3. This permits the gears 68 to extend from the orbit gear to a position where they may mesh with a sun gear 69 and a ring gear 70 which are rotatably mounted in the mechanical control unit.

The sun gear 69 is constructed and mounted within the device in a similar manner to the arrangement of the sun gear 5, shown in Fig. 1. The gear 69 is provided with an integral sleeve 71 which is adapted to engage and be held rigid with a sleeve 72 of a drum 73. The sleeve connection of the gear 69 and the drum wheel 73 is similar to the gear and drum wheel connection shown in Fig. 17, which consists of clutch engaging lugs carried on the contacting faces of each of the sleeves 71 and 72. The ring gear 70 of the idler 68 is rotatably mounted in the device and formed in a band wheel type so that the outer periphery thereof may be used for brake purposes. Each of the drums 7, 73, and 70, are or may be provided with brake bands so that they may be intermittently held against rotation so as to cause the mechanism to drive the load shaft 6 in various speed ratios relative to the drive shaft 2. When either of the drums are held against rotation, the gear of that particular drum acts as a track for the planet gears that may mesh with the same, and serve to cause the planet gears to rotate and carry the disk 4 for driving the shaft 6, the size of the drum gear governing the speed of the drive of the load shaft 6 relative to the speed of the shaft 2 and its orbit gear 1. The orbit gear 1 is also formed so that the outer periphery may be used as a drum for an emergency brake for the vehicle.

In the operation of the speed control of the type shown in Figs. 18, 19, and 20, the low speed is attained by holding the drum 70 against rotation which will act as a track for the idler planet gears 68 and cause the same to carry the idler gears 68 around the axis of the device within the inner periphery of the gear 70 for rotating the disk 4 and its shaft 6. The drum wheel 70 is then released and the drum wheel 7 is held against rotation by the brake 8 and its lever 8' which causes the planet gear 5 to act as the track for the planet gear 3, which will rotate the load shaft in what may be termed as second gear, as in the control of the construction shown in Fig. 1. When the operator wishes to drive the car in reverse or to drive the vehicle backwards he may lock the drum 73 against rotation which will cause the gear 69 to stand and serve as the track for the idler gear 68 which will rotate the shaft 6 in the opposite direction of the rotation of the shaft 2. From this structure it is apparent that a plurality of speeds may be attained by the use of a plurality of idlers journaled in the device similar to the idlers 68 and each provided with a track for causing the same to drive the shaft 6 at a predetermined speed ratio relative to the speed of the drive shaft 2 or the speed of the rotation of the drive gear 1. It is also apparent that the gears of the device may be varied in their relation to each other and the device adapted to act with or without the conventional transmission without departing from the spirit of this invention. It has been found that the two speed structure, shown in Fig. 1, is adaptable to be successfully used with a conventional transmission in conjunction with a two speed differential which provides as many as ten forward speeds for the vehicle as well as two reverse speeds.

What I claim is:

1. In a speed control mechanism for motor vehicles and the like consisting of a driven gear, epicyclic gears meshed with said driven gear and adapted to be driven thereby, a ratchet means cooperating with said epicyclic gears for varying the ratio of their disk relative to the ratio of the sun gear thereof, and a ratchet means for locking said epicyclic gears with said driven gear.

2. In a speed control mechanism for motor vehicles and the like consisting of a driven gear adapted to mesh with and drive a plurality of sets of epicyclic gears, said epicyclic gears being journaled on a disk and adapted to drive the load shaft of said mechanism, means cooperating with said epicyclic gears for varying the speed of said load shaft relative to the speed of the idlers thereof, said means consisting of a plurality of idlers meshed with said epicyclic gears and being provided with locking means, and means for locking said shaft with said driven gear for causing a direct drive of the same.

3. In a speed control mechanism consisting of a driven gear meshed with and adapted to drive a plurality of planet gears, said planet gears being journaled on a disk made rigid with the load shaft of said mechanism, a sun gear journaled in said mechanism and adapted to be driven by said planet gears, means for controlling the speed of said sun gear for decreasing the speed of said load shaft relative to the speed of said driven gear, means for synchronizing said sun gear with said load shaft, and causing the same to lock said gears together for causing a direct drive of said shaft.

4. In a speed control mechanism consisting of a driven orbit gear adapted to mesh with and drive a plurality of planet gears, said planet gears being journaled on a disk made rigid with the load shaft of said mechanism, idlers journaled on said disk and adapted to be driven by said planet gears, sun gears journaled in said mechanism and adapted to be driven by said planet gears and said idlers, means for intermittently holding each set of said sun gears against rotation for causing said driven orbit gear to drive said shaft at various speeds, and ratchet means for locking all of said gears together for causing said orbit gear to drive said shaft directly.

5. In a speed control mechanism for motor vehicles and the like consisting of a drive shaft having an orbit gear made rigid therewith, planet gears meshed with said orbit gear and adapted to be driven thereby, said planet gears being journaled on a disk made rigid with the load shaft of said mechanism, means cooperating with said planet gears for causing said load shaft to be driven at variable speeds relative to the said drive shaft, means for synchronizing the planetary gears with said load shaft and causing the same to lock all of said gears together for causing said drive shaft to drive said load shaft directly.

6. In a speed control mechanism consisting of a driven orbit gear meshed with and adapted to drive a plurality of planet gears, said planet gears being journaled on a disk made rigid with the load shaft of said mechanism, idler gears journaled on said disk and adapted to be driven by said planet gears, a pair of sun gears journaled in said mechanism and adapted to be driven by said planet gears and said idlers, means for holding one of said sun gears against rotation for causing said orbit gear to drive said shaft at a predetermined speed relative to the speed of said orbit gear, means for holding one of said sun gears for causing said load shaft to be driven in reverse, and means for locking one set of said sun gears with said shaft for causing said orbit gear to drive said shaft directly.

7. In a speed control mechanism for motor vehicles and the like consisting of a drive shaft having an orbit gear made rigid therewith, said orbit gear being meshed with and adapted to drive a plurality of planet gears, said planet gears being journaled on a disk made rigid with the load shaft of said mechanism, idler gears journaled on said disk and adapted to be driven by said planet gears, means cooperating with said planet gears and said idlers consisting of a friction disk and a ratchet clutch for intermittently causing said planet gears and each of said idlers to vary the speed of said drive shaft relative to the speed of said load shaft, and means for actuating said ratchet clutch for rotatably locking said shafts together.

8. In a speed control mechanism for motor vehicles and the like consisting of a drive shaft having an orbit gear, a plurality of sets of planet gears driven by said orbit gear, said planet gears being journaled on a disk made rigid with the load shaft of said mechanism, idlers journaled on said disk and adapted to be driven by said planet gears, means cooperating with said planet gears and said idlers for causing said drive shaft to intermittently drive said load shaft at variable speeds relative to the speed of said drive shaft, means cooperating with one of said idlers for causing said drive shaft to drive said load shaft in the opposite direction to the direction of rotation of said drive shaft, and means for locking all of said gears against rotation for causing said drive shaft to drive said load shaft directly.

9. In a speed control mechanism having a drive shaft provided with a drive gear, gears journaled on the load shaft of said mechanism and adapted to be driven by said drive gear, sun gears carried on said shaft and adapted to mesh with said last named gears, means cooperating with said last named gears consisting of a friction disk and a ratchet adapted to be actuated for causing said drive shaft to intermittently drive said load shaft at predetermined speeds relative to the speed of said drive shaft, and means for holding said gears inoperative for causing said drive shaft to drive said load shaft directly.

10. In a speed control for motor vehicles and the like consisting of a planetary type of gearing adapted to coact with the transmission of said vehicle for causing said vehicle to be driven at variable speeds relative to the drive shaft of the transmission thereof, synchronizing means carried by said gearing and adapted to cooperate therewith, and means for holding said planetary gears inoperative for causing said shaft to drive said vehicle directly.

11. In a speed control mechanism for motor vehicles and the like consisting of a planetary type of gearing adapted to coact with the transmission of said vehicle, a ratchet cooperating with and adapted to actuate said gearing for causing the drive shaft of said transmission to be driven at variable speeds relative to the speed of said vehicle, and means cooperating with said gearing for causing said shaft to drive said vehicle directly.

12. In a speed control mechanism for motor vehicles and the like comprising a planetary type of gearing adapted to coact with the transmission of said vehicle, means for synchronizing the sun gear of said gearing and a lock cooperating with said synchronizing means for causing a variable decrease of the vehicle speed relative the speed of the drive shaft of the transmission in each of the various speeds of said transmission, and means for holding said gearing inoperative for a direct drive of said vehicle.

13. In a speed control mechanism for motor vehicles and the like consisting of a planetary type of transmission having the planet gears of the same journaled on a disk made rigid with the load shaft of said transmission, a friction disk adapted to synchronize the load shaft with said sun gear, a clutch adapted to engage said disk and hold said sun gear against rotation for changing the speed of the drive shaft of said transmission to variable speeds relative to the speed of said load shaft, and means for locking said transmission gears together for causing a direct drive of said shafts.

14. In a speed control mechanism for motor vehicles and the like consisting of a planetary type of gearing, idler gears carried in said mechanism and adapted to be driven by the planet gears of said mechanism, sun gears for said idlers, a friction disk and a ratchet cooperating with said sun gear and adapted to be actuated for holding said sun gears against rotation for intermittently changing the speed of the drive shaft and load shaft of said mechanism, and means for locking said shafts together for a direct drive.

15. In a speed control mechanism for motor vehicles and the like consisting of a drive shaft having a drive gear made rigid therewith, a plurality of gears journaled on a disk made rigid with the load shaft of said mechanism and adapted to be driven by said drive gear, idlers carried on said disk and adapted to be driven by said plurality of gears, a clutch for controlling each of said idler gears and said plurality of gears for changing the speed ratio of said drive shaft relative to the speed ratio of said load shaft, and means for holding said gearing inoperative for causing said drive shaft to drive said load shaft directly.

16. In a speed control mechanism for motor vehicles and the like consisting of a drive shaft having a drive gear made rigid therewith, planet gears driven by said drive gears, idler planet gears adapted to be driven by said planet gears, sun gears meshed with and adapted to be driven by each of said idler gears and said planet gears, means for holding said sun gears against rotation for intermittently causing a change of speed ratio of said drive shaft relative to the ratio of said load shaft, means cooperating with said gears for causing a free-wheeling of said load shaft relative to said drive shaft, and means for causing said drive shaft to drive said load shaft directly.

17. In a speed control mechanism for motor vehicles and the like consisting of a driven gear, epicyclic gears journaled on a disk made rigid with the load shaft of said mechanism and adapted to be driven by said driven gear, idlers meshed with said epicyclic gears and adapted to be driven thereby, means for intermittently holding said idlers against rotation for changing the speed ratio of said load shaft relative to the ratio of said driven gear, means for synchronizing one of said idlers with said load shaft, and means for locking said synchronized idler with said load shaft for causing said driven gear to drive said shaft directly.

18. In a speed control mechanism for motor vehicles and the like consisting of a driven gear adapted to mesh with and drive a plurality of epicyclic gears, said epicyclic gears being journaled on the disk of the load shaft of said mechanism, idlers journaled within said mechanism and adapted to be driven by said epicyclic gears, means for holding said idlers against rotation for changing the speed ratio of said load shaft relative to the ratio of said driven gear, a ratchet cooperating with said load shaft and adapted to actuate said idlers for causing the load shaft to travel faster than said driven gear, means for locking said gears together for causing said driven gear to drive said shaft directly, and means cooperating with said locking means for overcoming the back lash of the load of said load shaft.

19. In a speed control mechanism for motor vehicles and the like consisting of a driven gear, planet gears journaled on a disk made rigid with the load shaft of said mechanism and adapted to be driven by said driven gear, a sun gear journaled in said mechanism and provided with a disk adapted to synchronize the same with said load shaft, idler gears journaled on said disk and adapted to be driven by said planet gears, said idler gears adapted to drive said sun gear, a ratchet cooperating with said disk and adapted to be actuated for holding said sun gear against rotation for varying the speed of said load shaft relative to the speed of said driven gear, and means for actuating said ratchet for causing said driven gear to drive said shaft directly when said holding means is released.

SAMUEL A. B. HAMILTON, Jr.